July 10, 1945.  V. J. BURNELLI  2,380,289
MILITARY AIRCRAFT
Filed Nov. 26, 1940  2 Sheets-Sheet 1
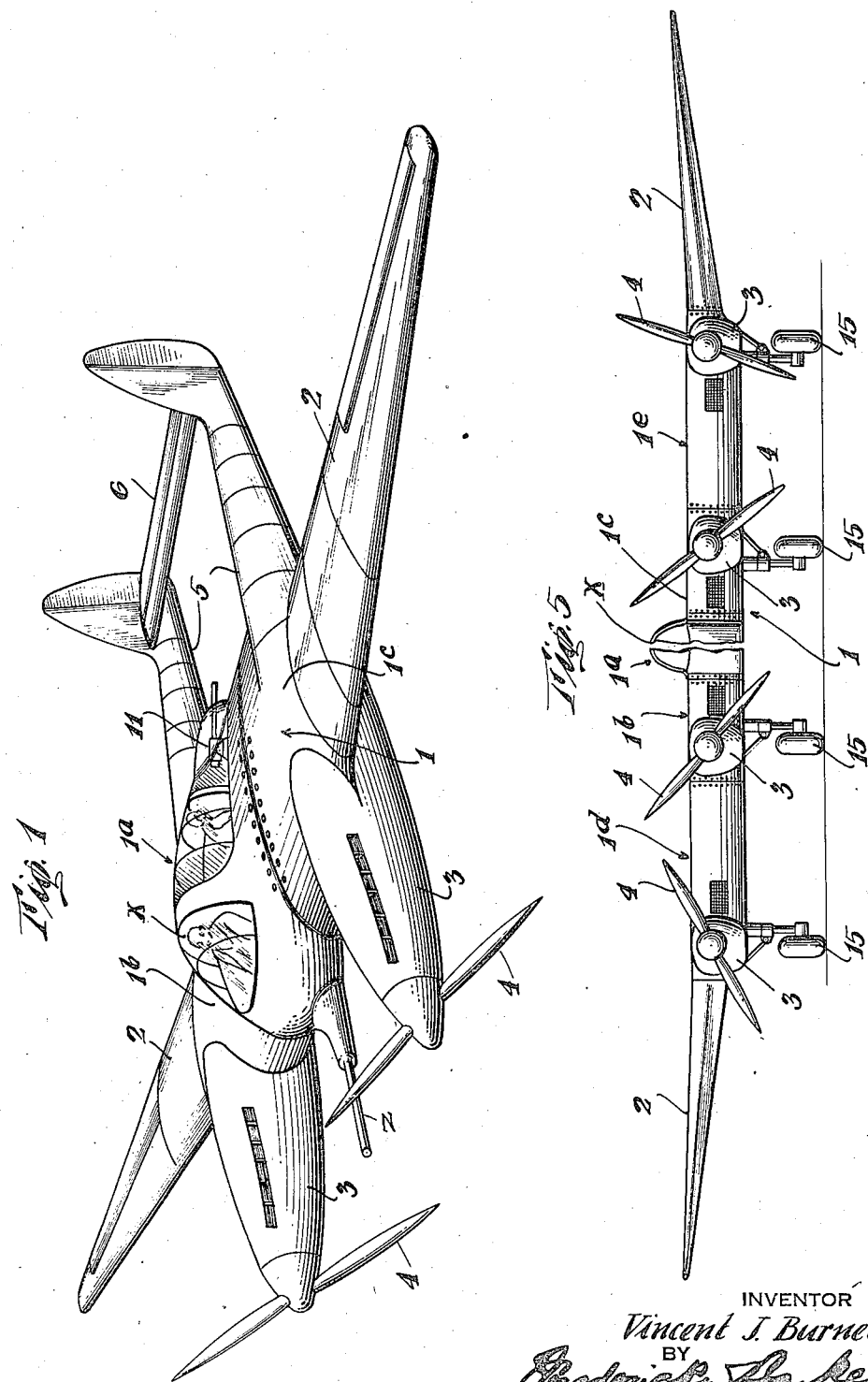
INVENTOR
Vincent J. Burnelli
BY
ATTORNEY

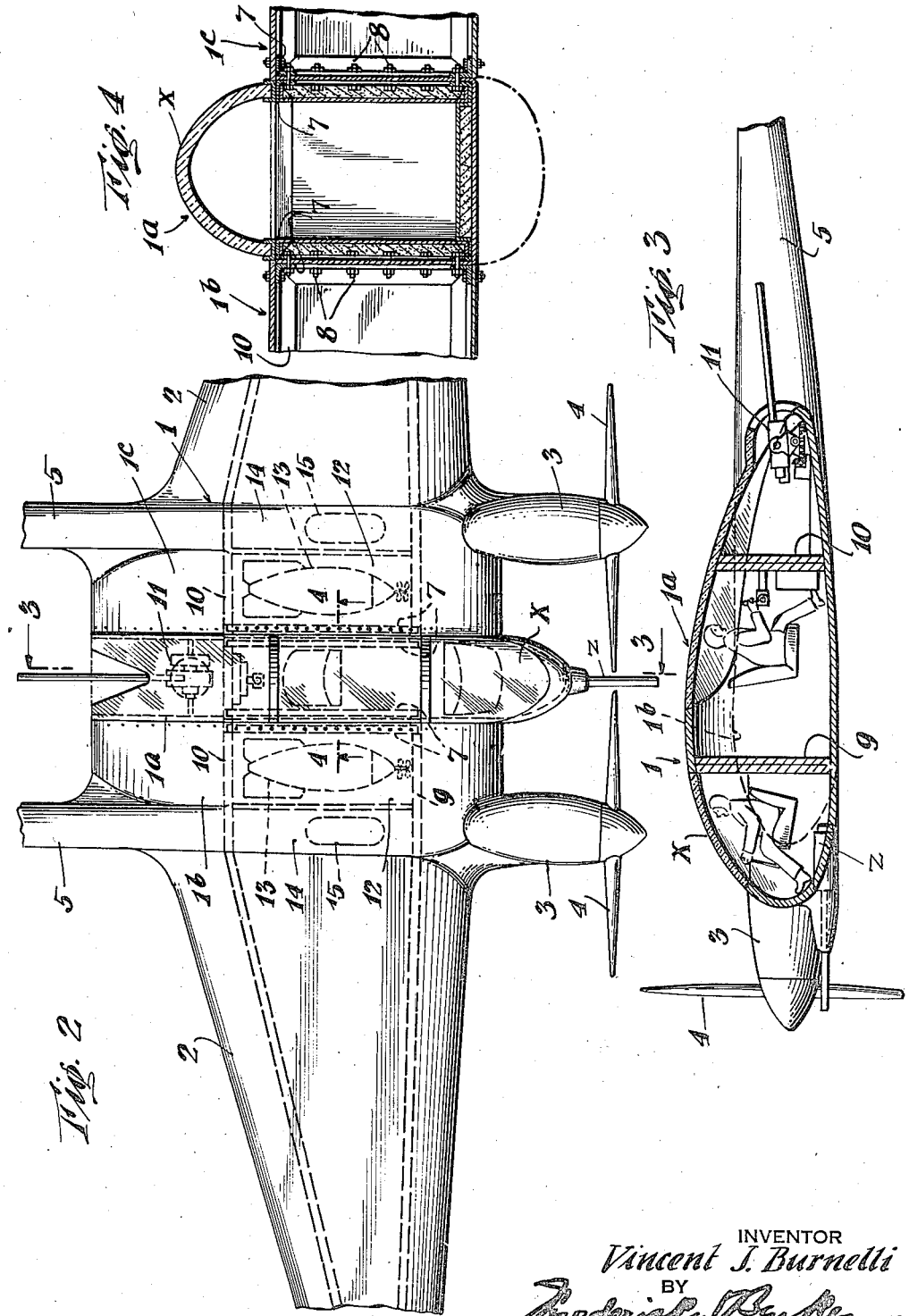

Patented July 10, 1945

2,380,289

UNITED STATES PATENT OFFICE 2,380,289

MILITARY AIRCRAFT

Vincent J. Burnelli, Matawan, N. J., assignor to V. J. Burnelli Airplanes Inc., Red Bank, N. J., a corporation of New Jersey Application November 26, 1940, Serial No. 367,209

1 Claim. (Cl. 244—124)

This invention relates to military aircraft of the all-wing, Burnelli type, wherein the central wing section is deepened and forms a lifting fuselage.

Essentially my improvement comprehends the sectionalizing of the central wing section in order that it may be composed of a plurality of spanwise units that are capable of being bolted or otherwise detachably secured together, to thereby constitute a composite lifting fuselage of desired span extent, and whose component units may be replaceable.

The crew unit being a separate individual section of the lifting fuselage and being the only section thereof that needs to be armored, it will be recognized that the over-all weight of an aircraft of the type of this invention will be greatly conserved. Additionally, such crew compartments may be interchangeable, that is, one designed with the structural strength to resist the pressures of supercharging, may be substituted for a crew compartment not having such strength factors when the aircraft is to be used in high altitude work. Thus, an aircraft is provided by my invention, which embodies means whereby, through replaceability or interchangeability of the sectional units constituting the lifting fuselage, weight factors of the aircraft may be conserved.

In particular the crew unit, intended for occupancy by the pilot and other crew members, is to be armored for protection against enemy fire, also to provide the structural strength to resist the pressures of supercharging, when at high altitudes. In this connection I provide a rear gun, located outside the armored enclosure and operated by remote control from within such armored unit.

Other features and advantages of my invention will hereinafter appear.

In the drawings:

Figure 1 is a perspective view of a military airplane according to my invention.

Fig. 2 is a top plan view.

Fig. 3 is a section on the line 3—3 of Fig. 2.

Fig. 4 is an enlarged sectional view on the line 4—4 of Fig. 2, and

Fig. 5 is a front view of an airplane showing a larger number of sectional units assembled in the composition of the lifting fuselage, and which sections standardize the engine, cooling, accessory, landing gear and tail support installations for quantity production.

In Figs. 1 to 4 let 1 indicate generally the lifting fuselage or central element of an all-wing airplane, having the outspanned or lateral wing elements 2. Engine carrying nacelles are indicated at 3, with propellers 4. Booms 5 that extend rearwardly from the element 1 carry the empennage 6.

The element 1 appears as composed of the separate units 1a, 1b and 1c, whereof the typical unit 1a is formed of or protected with armor and is covered by a hatch of thick, bullet-proof glass, indicated at $x$. As here shown, for example, angles 7 are used to connect the walls of adjacent units 1a, 1b, 1c by means of bolts 8; also to connect said units to their respective bulkheads 9, 10.

In Figs. 1 and 3 a pilot is shown as seated in advance of the forward bulkhead in unit 1a, and a gunner is shown as seated in advance of the rear bulkhead, the gun 11, which is located in the trailing portion, for rearward fire, is provided with means for its manipulation (only diagrammatically illustrated), and is remotely controlled, both in its movements and firing, from the gunner's position within unit 1a, thus permitting unit 1a to be supercharged.

In each of the units 1b, 1c, flanking unit 1a and attached thereto as in the manner stated, there is a compartment 12 adapted to carry bombs 13, or extra fuel, and exteriorly of said compartments 12 are provided other compartments 14 adapted for the reception of the retractable wheels 15, or intermediate sections for the accomodation of air-ducts for the installation of turbo supercharger equipment.

Should the armoring be used to encompass the entire central wing section the weight thereof would be excessive and therefore it is only that portion of the central wing section, i. e. the crew containing unit 1a that is to be protected from gun fire, to thus save the occupants of said unit from the danger of attack.

The armor protection for the unit 1a may be composed of steel plates spaced apart, integral with the structure, and with an interfilling of steel wool or other suitable filling material, in the interest of lightness in weight, because solid armor plating of equal efficiency might be of too great weight.

The strength of the armor protected unit 1a has the further advantage that supercharging for high altitude performance can be applied to the crew compartment alone, instead of having to reinforce the entire central wing section for withstanding the pressures created by supercharging. Thus, by armoring the crew compartment the double purpose is served of protecting the crew from gun fire and enabling said crew compartment to be supercharged by reason of its armored reinforcement.

Furthermore, this unit 1a may be designed for use in different types of military aircraft, such as bombers, pursuit planes, interceptors, observation and photographing planes, wherein characteristic designs can be carried out, and these units 1a can be produced separately from the other units of the central wing section, and of different width, height and length to provide increased space for operating requirements or for side by side crew seating arrangement.

It will be appreciated that the design of the unit 1a will determine the type of the military plane of which it forms a part, because, for example, a photographing plane might require the unit 1a to be deepened well below the other units of the central wing section, to accommodate the photographic apparatus, (see dotted line in Fig. 4), thus increasing the drag and diminishing the speed of the airplane, whereas for a pursuit plane, which should have a minimum of drag, the lines of the unit 1a will blend more closely with the general contours of the other units in the central wing section assemblage. Also the glass hatch may have varied conformation; also varied width.

The main structure may be standardized for mass production, with obvious production advantages.

In the event of a unit becoming damaged the bolts by which it is secured may be removed and a new unit placed in its stead or conversion for different service arranged.

In Fig. 5 there is exhibited an airplane whose central wing section is shown to be composed of the units 1a, 1b and 1c, with the addition of further outspanned units 1d, 1e, thus increasing the all over spanwise area of said central wing section, these units 1d, 1c being connected to their adjacent units in manner similar to that previously referred to. Obviously I am not to be limited to the number of units composing the central wing section, which are provided with quick detachable flight and engine control connections.

With this invention a standard type of lifting fuselage composed of sectional units, for mass production, one set of jigs and fixtures will suffice for the main structure, and different functional operating requirements can be provided by interchange of the unit which comprises the crew compartment.

It is recognized that the larger the number of aircraft units that are to be produced the more economical will be the cost of construction.

The main variation in aircraft design for a standardized type to perform varied military service affects the crew compartment. The interchangeable crew unit which is the main feature of this invention permits, as has been described, one type of tooling, dies, jigs and fixtures to produce aircraft in greatly enlarged quantities with greatly improved standardization and economy for mass production and maintenance in field service.

Enlargement of design by increased sectional units will provide a full flying fuselage type with the military equipment or cargo section of uniform structure. The complementary outboard wings will provide means for lateral stability and control with full lifting effect in climbing and landing attitude.

Variations within the spirit and scope of my invention are equally comprehended by the foregoing disclosure.

I claim:

An all-wing airplane comprising a central lifting fuselage section that is composed of separable spanwise units and means for detachably connecting said units, one to another, one of said units having less width than adjacent units, said one unit providing quarters for the entire crew and controls of the airplane and having protective armor, whereby said one unit is readily replaceable, said arrangement providing for weight conservation of the entire airplane.

VINCENT J. BURNELLI.